Patented Nov. 13, 1951

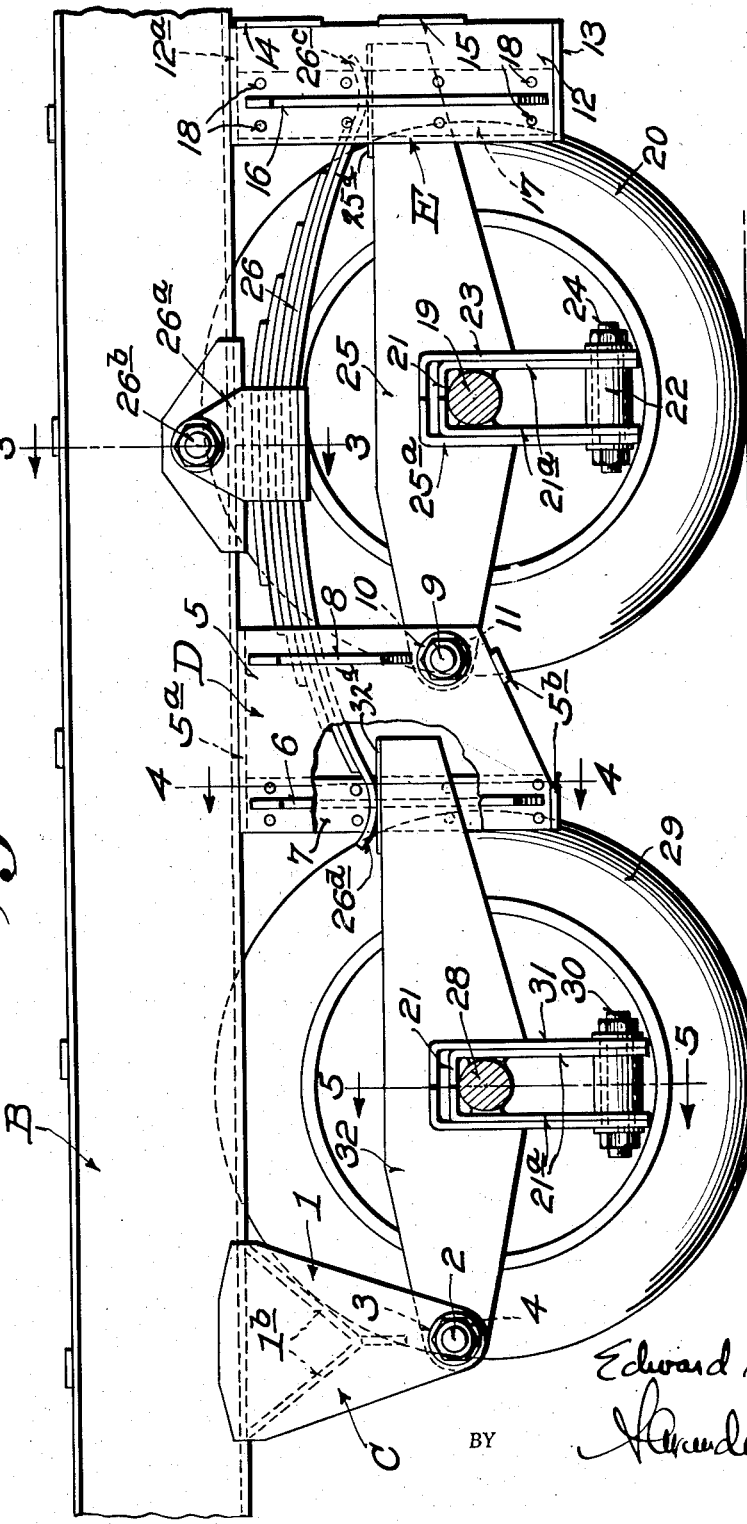

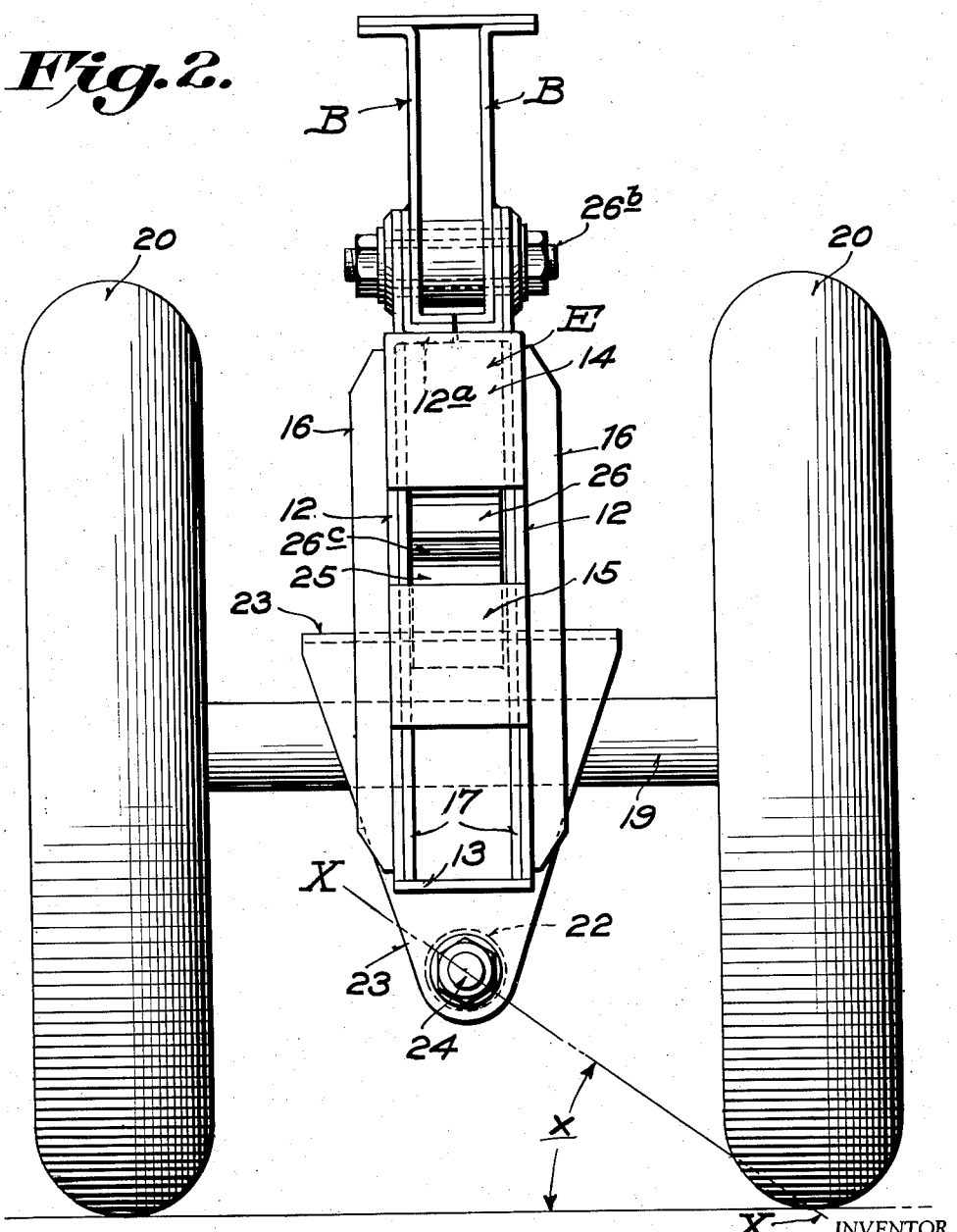

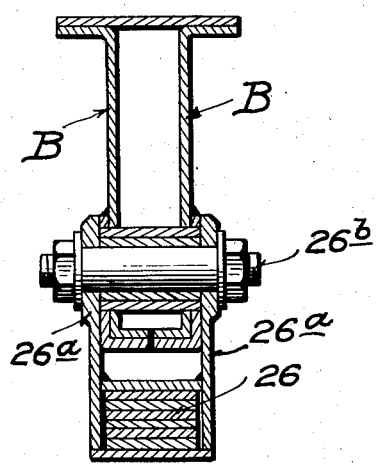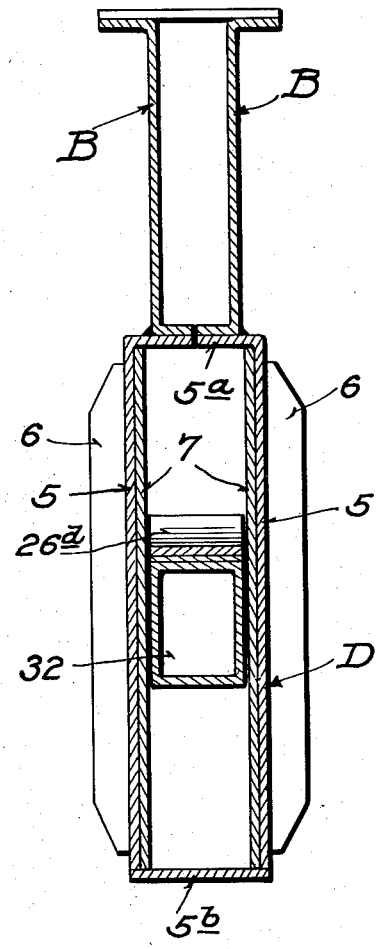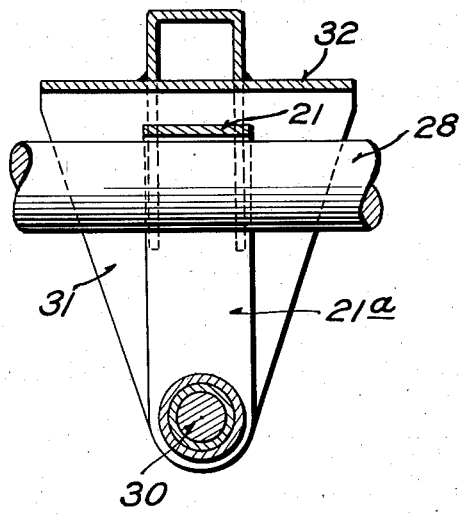

2,575,065

UNITED STATES PATENT OFFICE 2,575,065

DIFFERENTIAL WHEEL UNIT

Edward C. Merry, Greensboro, N. C., assignor of one-half to Guy M. Turner, Greensboro, N. C.

Application November 10, 1949, Serial No. 126,637

4 Claims. (Cl. 280—104.5)

This invention is a novel differential wheel unit for trailers or the like particularly adapted to be mounted on trailing vehicles to support the rear ends thereof, whereby the vehicle may be operated at normal high speeds with safety, each unit comprising a short axle carrying a single pneumatic or other tire at each end, the axle being adapted to pivot transversely of the vehicle on an axis disposed below the axle, and the multiple units being connected together so as to cause one axle to rise or fall as the adjacent axle falls or rises, or vice versa.

The present invention is an improvement on the differential wheel unit shown in my copending application Serial No. 61,345, filed November 22, 1948, in which the forward end of the leading longitudinal axle carrying member was positively prevented from shifting laterally with respect to the leading bracket frame while the rear end of said member was permitted a yieldable lateral shifting movement, also the forward end of the trailing longitudinal axle carrying member. The rear end of the trailing longitudinal member was permitted an unrestrained lateral movement with respect to the rear bracket frame; and both members permitted a longitudinal shifting movement with respect to the said bracket frame.

The present invention is also an improvement upon the differential wheel unit disclosed in my copending application Serial No. 121,344 filed October 14, 1949, in which both longitudinal axle-carrying members are permitted a longitudinal movement, but neither is permitted a lateral shifting movement.

Heretofore, somewhat similar units have been used to support the rear ends of such trailers but same have usually been designed primarily to maintain the platform height of the trailer as low as possible from the ground, to facilitate loading and unloading of heavy machinery or other loads. The structures disclosed in the prior art would not be practical for fast freight carrying vehicles due to their use of dual or triple wheels at each end of the short axles with tires having undue sectional width.

My arrangement, however, is specially adapted for commercial high-speed vehicles for highway use, my unit utilizing standard sized single wheels mounted on conventional short axles, instead of the usual dual or triple wheels, or special trucks, heretofore used.

Contrary to the purpose of prior art structures, in carrying the loads below the axles for the express purpose of maintaining the platform height as low as possible, in my design, the load is suspended below the axles primarily to keep the axel itself from tipping when severe side thrusts at high speeds are encountered. In using short axles with wheels of large diameter having a center-to-center distance of approximately twenty-eight inches, there would normally be a great tendency for the axles to tip laterally when the load carrying point is disposed on the axle, or adjacent to same. In order to assure that this type of unit assembly will perform satisfactorily without tipping, the load must be carried at a point sufficiently below the axle to overcome the tipping tendency due to severe lateral tire overloads. Research has developed the fact that if the angularity of this pivot point is located at approximately 45° or less angle from the point of wheel contact with the road, the operation of the unit is very satisfactory, and the axis is still properly positioned with respect to road clearance.

The use of large diameter tires in combination with short axles, and the location of the carrying point within the above described angular range are therefore the important features of my present invention; and the prior art structures do not specify that either such requirement is critical, with respect to the use of short axles in high speed highway service. Research has shown a critical relationship between the angularity of the point of road contact of the tire and the load carrying point, which angularity can range satisfactorily within the above mentioned range.

I will explain the invention with reference to the accompanying drawings, which illustrate one practical embodiment thereof, to enable others familiar with the art to adopt and use the same; and will summarize in the claims, the novel features of construction, and novel combinations of parts, for which protection is desired.

In said drawings:

Figure 1 is a side elevation, showing my novel differential wheel unit mounted to support one side of the rear end of a trailer.

Fig. 2 is a rear end view of the differential unit shown in Fig. 1.

Fig. 3 is an enlarged vertical section on the line 3—3, Fig. 1.

Fig. 4 is an enlarged vertical section on the line 4—4, Fig. 1; and

Fig. 5 is an enlarged vertical section on the line 5—5, Fig. 1.

As shown, the trailer body is provided with side frames B at each side thereof in the usual manner, same being usually of structural steel shape, and same forming no part of my present invention.

My tandem wheel units are disposed at both sides of the body frame, and since construction at both sides is identical, it is only necessary to describe the unit at one side thereof.

At each side of frame B, adjacent the rear end thereof, is an open depending frame C, consisting of opposed parallel side plates 1 which are fixedly secured to the underside of side frame B of the trailer body in any desired manner. The side plates 1 are reinforced by webbing 1b to maintain their parallel spacing; and at their lower ends the side plates 1 are provided with opposed holes for the reception of a bolt 2, surrounded by a cast steel ring 3 between which ring 3 and bolt 2 is a bushing 4, for the purpose hereinafter described.

Between the bracket C and the rear end of each side frame B of the truck body, is a second bracket frame D (Figs. 1 and 4) including a base 5a, and parallel side plates 5, base 5a being secured by welding or the like to the underside of the side frame B (Fig. 4) in alignment with the related bracket C. The side plates 5 are secured together at their lower ends by a plate 5b, welded to the lower ends thereof.

Vertically disposed adjacent the side edges of bracket D are external vertical reinforcement plates or ribs 6 preferably welded to the forward portions of the outer faces of side plates 5 to strengthen the same; and on the inner faces of side plates 5 adjacent the forward side edges thereof are removable wear plates 7 (Fig. 4) secured thereto in any desired manner, for the purpose hereinafter described.

At the rear ends of side plates 5 are other external vertical reinforcing plates or ribs 8 (Fig. 1) to strengthen the same; and below ribs 8 are opposed holes for the reception of a bolt 9, surrounded by a cast steel ring 10, between which ring 10 and bolt 9 is a bushing 11, for the purpose hereinafter described.

At the rear end of each side frame B is a third bracket E (Figs. 1 and 2) disposed in alignment with the brackets C and D, each bracket E being disposed the same axial distance from the center of bracket D as the bracket C.

Bracket E consists of a base 12a secured to side plates 12, the lower ends of which are connected together by a plate 13 to maintain their spaced relation, the rear edges thereof being connected by spacer plates 14 and 15. On the exterior of plates 12 are vertical reinforcing ribs 16; and opposite said ribs 16 on the inner faces of plates 12 are wear plates 17 secured thereto by screws 18 or the like.

Between the bracket frames D—E is an axle 19, at each side of the rear end of the trailer, which axle 19 is non-rotatable but carries at each end thereof ground wheels 20—20 disposed at each side of its respective side frame B. Directly beneath each respective side frame B is an axle bracket comprising a collar 21 (Fig. 1) welded to axle 19 and having parallel depending legs 21a carrying at their lower ends a cylindrical steel tube 22 adapted to snugly receive a bushing hereinafter described, the ends of the tube 22 being welded to the lower ends of the legs 21a. Straddling the legs 15a is an inverted U-shaped strap 23 having opposed holes at its lower end opposite tube 22 and receiving a shacklebolt 24, said shacklebolt 24 extending through the holes in the legs of strap 23 and through the bushing 22.

The upper end of the inverted U-shaped strap 23 is welded into a rectangular recess 25a in a longitudinal member 25 (Fig. 1) the respective ends of which enter between the plates 5 of the center bracket D and the plates 12 of the rear bracket E, as clearly shown in Fig. 1, whereby the member 19 is maintained in axial alignment with the overlying frame member B of the trailer, the sides of member 25 directly engaging the wear plates 17 of bracket E and the side plates 5 of bracket D, to prevent lateral shifting of member 25 therein, while permitting the rear end of member 25 to rise and fall in bracket E. The forward end of longitudinal member 25 is pivoted on the bolt 9 carried by bracket D. The rear end of member 25 (Fig. 1) carries on its upper face a wear plate 25d. A leaf spring 26 has its central portion 26a pivoted as at 26b to the related side frame B, and its rear end 26c entered between the side plates 12 of rear bracket E, same yieldingly contacting the top of the wear plate 25a to constantly urge same downwardly in bracket E.

Between the brackets C—D is an axle 28, similar in all respects to axle 19 and carrying wheels 29 at opposite sides thereof. A second strap 21—21a is welded or otherwise secured to axle 28, same carrying at its lower end a shacklebolt 30. Straddling the second strap 21—21a is a second U-shaped member 31 similar in all respect to the first member 23, the base of which is welded or otherwise secured in a correspondingly shaped recess in a second longitudinal member 32, similar in all respects to the first longitudinal member 25, said second member 32 having opposed holes in its lower end receiving the second shacklebolt 30, whereby said axle 28 may tilt laterally with respect to the second longitudinal member 32.

The rear end of the second longitudinal member 32, as shown in Fig. 1, carries a wear plate 32d similar to wear plate 25d, while the forward end of the second longitudinal member 32 is pivoted on a shacklebolt 2 carried by bracket C to prevent vertical or lateral shifting of the member 32 in bracket C while, however, the rear end of the second longitudinal member 32 may rise and fall in bracket D.

The rear end of the second longitudinal member 32 within bracket D is engaged by the forward end 26d of spring 26. By the above construction the forward ends of the longitudinal members 25 and 32 are pivoted in their respective brackets D and C while being prevented from vertical or lateral movements thereon. The rear ends of the members 25 and 32 are depressed by the respective ends 26c and 26d of the pivoted spring 26 so that if one member such as 32 rises in its bracket the other member 25 will fall a yieldable corresponding amount, neither member 25 or 32 however being permitted to shift laterally of brackets D and E. The above arrangement dispenses with the necessity of providing the sprockets shown in Serial Nos. 61,345 and 121,344 journaled in bracket D and the chain running under said sprockets having its ends connected with the adjacent ends of the longitudinal members, thereby simplifying the construction and reducing the cost of the assembly, while producing the same results or functions.

The above construction provides a trailer wheel unit at each side of the rear end thereof which will be practical for fast freight carrying vehicles involving the use of dual wheels on short axles equipped with ordinary large size pneumatic or other tires thereon adapted for fast highway transportation.

In my design, the load of the trailer is carried at points disposed well below the axles 19 and 28, in order to keep said axles from tipping when severe lateral thrusts are imposed thereon. Ordinarily, in using short axles with large diameter wheels there is a strong tipping tendency, but for fast freight the load must be carried at points sufficiently below the axles to overcome the tipping tendency under severe lateral tire overloads. I have found that in order to maintain the axle stability, the load carrying points must be disposed sufficiently below the axles so that the angularity of a line X—X (Fig. 2) drawn from the center of a tire of a related wheel 20 at the point of road contact to the axle pivoting point 24, must be 45° or less, and my entire arrangement is designed accordingly. Thus, when the trailer is being drawn at high speeds there is little or no tendency on the part of the axles 19 and 28 to tip, and therefore maximum axle stability is maintained.

I do not limit my invention to the exact form shown in the drawings for obviously changes may be made therein within the scope of the claims.

I claim:

1. In a trailer having a body provided with side beams, spaced aligned open-ended bracket frames depending below the side beams; horizontal aligned members each having their leading ends entered into and pivotally connected with walls of the leading pairs of bracket frames, and their trailing ends slidably contacting the walls of the trailing pairs of bracket frames for preventing lateral movement of the members therein while permitting vertical movement therein; relatively short axles carried by said members and mounted to pivot transversely thereof, the pivot points being intermediate the ends of and disposed below said axles; single wheels journaled on the respective ends of said axles; spring means carried by the side beams and engaging the trailing ends of the members whereby as the end of one member rises the end of the other member will correspondingly fall a yielding amount, and vice versa; said spring means yieldably urging the trailing ends of the horizontal members downwardly in their respective brackets.

2. In a trailer as set forth in claim 1, said brackets including spaced parallel side plates engaging the sides of the horizontal members; wear plates on the tops of the trailing ends of the horizontal members within the end brackets; and said spring means comprising leaf springs having their central portions pivoted to the side beams and their other ends entering the trailing brackets and contacting the said wear plates.

3. In a trailer as set forth in claim 1, said members having inverted U-shaped portions straddling the axles; other inverted U-shaped members secured to the axles and embraced by the first named U-shaped members; and torque bushings transfixing the lower overlapping ends of the U-shaped members and forming the said pivot points of the axles.

4. In a trailer as set forth in claim 3, the angularity of the pivot points with respect to the central points of contact of a related wheel with the road surface being no greater than 45°, in order to minimize tipping tendency of the axles at high trailer speeds when the body is subjected to substantial lateral thrusts.

EDWARD C. MERRY.

REFERENCES CITED

The following references are of record in the file of this patent:

UNITED STATES PATENTS

| Number | Name | Date |
| --- | --- | --- |
| 2,424,141 | Black | July 15, 1947 |
| 2,459,372 | Fraunfelder | Jan. 18, 1949 |